(12) United States Patent
Nygren et al.

(10) Patent No.: US 6,530,718 B2
(45) Date of Patent: Mar. 11, 2003

(54) CONNECTOR ASSEMBLY

(75) Inventors: William D. Nygren, Denver, CO (US); Jeremy Fix, Littleton, CO (US)

(73) Assignee: Lockheed Martin Corporation, Bethesda, MD (US)

(*) Notice: Subject to any disclaimer, the term of this patent is extended or adjusted under 35 U.S.C. 154(b) by 86 days.

(21) Appl. No.: 09/772,639

(22) Filed: Jan. 30, 2001

(65) Prior Publication Data

US 2002/0102130 A1 Aug. 1, 2002

(51) Int. Cl.[7] .............................. F16D 1/00; F16L 23/00
(52) U.S. Cl. ........................................ 403/337
(58) Field of Search .............................. 403/337, 343, 403/325, 321, 322.1, 315, 316; 411/354, 916

(56) References Cited

U.S. PATENT DOCUMENTS

| | | | |
|---|---|---|---|
| 2,771,647 A | 11/1956 | Hemstreet et al. | 22/113.5 |
| 3,302,960 A | 2/1967 | Herrmann | 287/119 |
| 3,405,593 A | 10/1968 | Kriesel | 85/33 |
| 3,887,150 A | 6/1975 | Jakubowski, Jr. | 244/137 R |
| 3,926,090 A | 12/1975 | Bunker | 85/33 |
| 4,002,120 A | 1/1977 | Swales et al. | 102/49.5 |
| 4,132,147 A | 1/1979 | Contaldo | 89/1.5 D |
| 4,350,074 A | 9/1982 | Bouget et al. | 89/1.5 D |
| 4,507,034 A | 3/1985 | Lew et al. | 411/21 |
| 4,520,711 A | 6/1985 | Robinson | 89/1.5 D |
| 4,655,657 A | 4/1987 | Duran | 411/348 |
| 4,850,774 A | 7/1989 | Weaver et al. | 411/298 |
| 5,060,888 A | 10/1991 | Vezain et al. | 244/158 R |
| 5,129,753 A | 7/1992 | Wesley et al. | 403/322 |
| 5,150,770 A | 9/1992 | Secci | 185/40 R |
| 5,160,233 A | 11/1992 | McKinnis | 411/433 |
| 5,312,152 A | 5/1994 | Woebkenberg et al. | 294/86.4 |
| 5,364,046 A | 11/1994 | Dobbs et al. | 244/161 |
| 5,520,476 A | 5/1996 | Marks et al. | 403/322 |
| 5,603,595 A | 2/1997 | Nygren | 411/366 |
| 5,695,306 A | 12/1997 | Nygren, Jr. | 411/433 |
| 5,718,531 A | 2/1998 | Mutschler, Jr. et al. | 403/28 |
| 5,722,709 A | 3/1998 | Lortz et al. | 294/86.4 |
| 5,743,492 A | 4/1998 | Chan et al. | 244/118.2 |
| 6,095,736 A | 8/2000 | Miller et al. | 411/352 |

Primary Examiner—Christopher J. Novosad
(74) Attorney, Agent, or Firm—Marsh Fischmann & Breyfogle LLP

(57) ABSTRACT

The invention is a separable connector that includes nut and bolt assemblies for joining two structural elements together. The thread geometry is selected such when the nut and bolt assemblies are threadably joined and a tension load applied therebetween, upon release of nut the tension load is converted into rotational energy causing the nut to rotate at high speed acting as a flywheel causing the nut to spin off of the bolt.

15 Claims, 9 Drawing Sheets

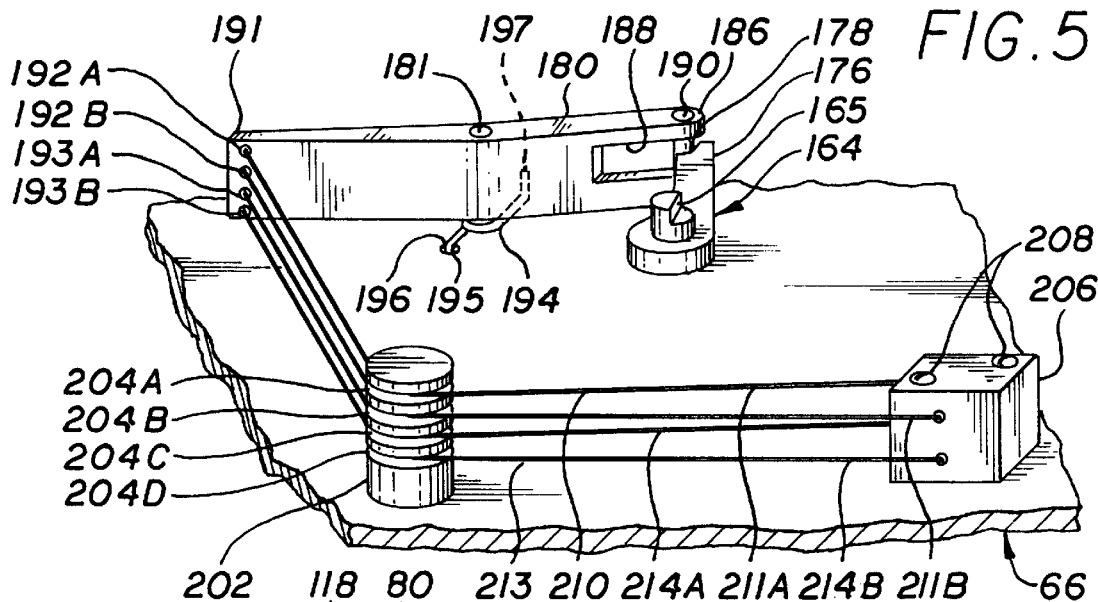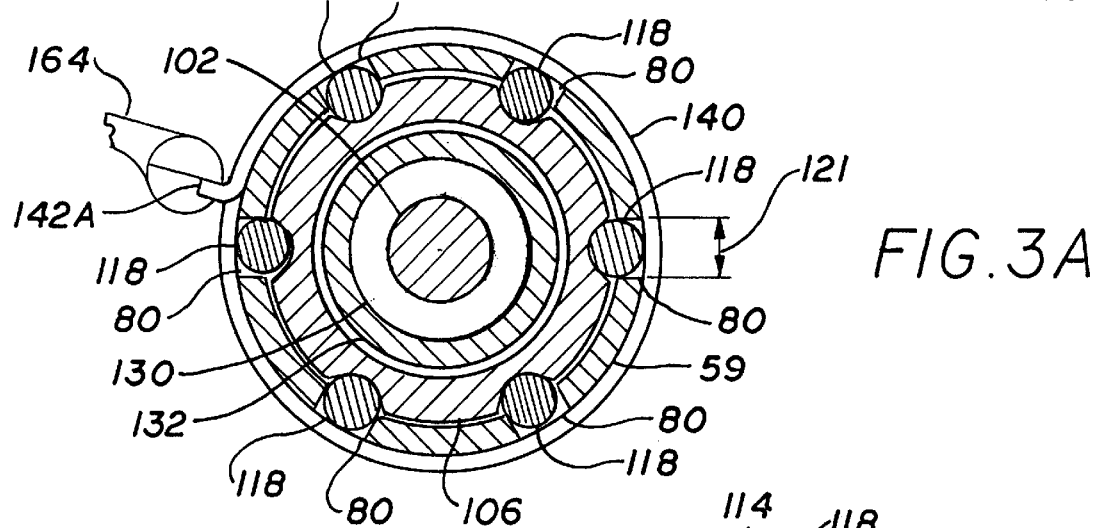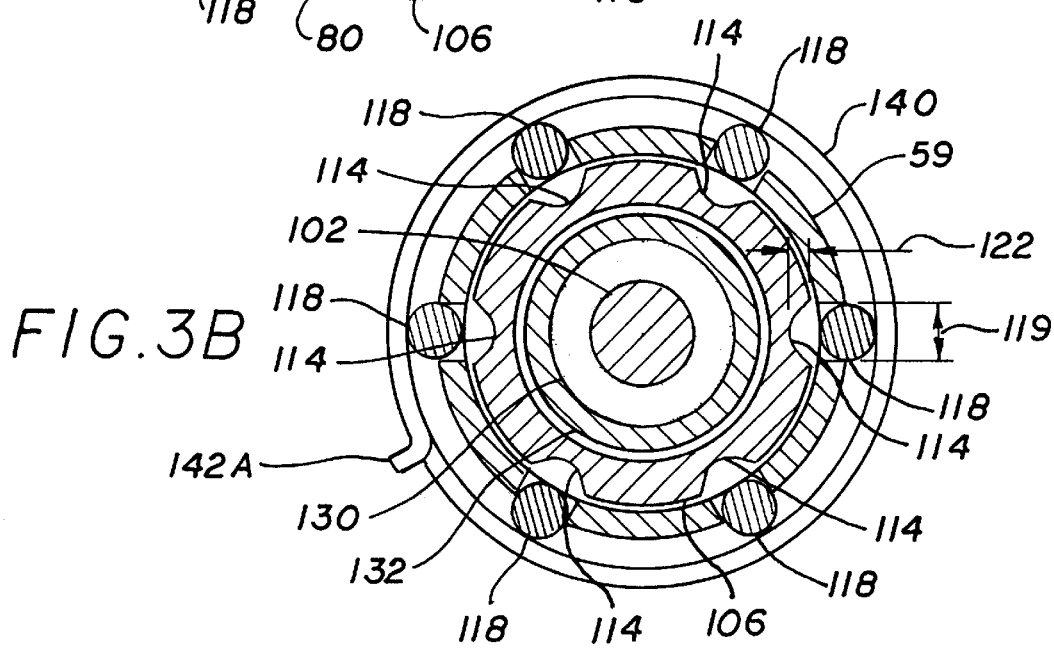

CONNECTOR ASSEMBLY

BACKGROUND OF THE INVENTION

1. Field of the Invention

The invention relates to the field of fasteners and, in particular, to a non-pyrotechnic fastener that automatically separates a nut from a bolt upon actuation.

2. Description of Related Art

Reliable fasteners that separate upon actuation have many applications. One critical application is on launch vehicles designed to place spacecraft into orbit. Not only must the fasteners reliably secure booster stages together under high loads, they must rapidly separate upon actuation in order to achieve proper timing of stage separation. This is particularly true when several fasteners must be simultaneously separated. Thus pyrotechnically actuated devices are typically used. One example can be found in U.S. Pat. No. 3,926,090 "Separation Nut" by J. W. Bunker. An extreme example is an explosive actuated system that uses a metal coupling to join the segments of the fairing together. A tubular member is positioned next to or within the coupling. Upon ignition, the explosive expands the tubular member, which in turn fractures the coupling. Such a system is disclosed in U.S. Pat. No. 5,443,492 "Payload Housing And Assembly Joint For A Launch Vehicle" by A. L. Chan, et al.

However, pyrotechnic fasteners and the like, while well proven, can not be tested prior to use, thus must be assembled with great care. This makes them generally expensive to manufacture. Special storage areas must be set aside for any device containing explosives. They are always subject to inadvertent actuation, and, therefore, handled with great care. Additionally, they are particularly subject to ignition by electromagnetic interference (EMI) and thus must be protected by EMI shielding devices, which also raises the cost. One of the most important disadvantages is that upon actuation, most generate significant shock loads, which can damage nearby equipment.

One approach to eliminate such problems is to use shape memory alloys to actuate the fasteners. Shape memory alloys offer a solution to the problem. There are basically two types of shape memory alloys:

1. Simple memory alloys where a deformation undergone in an austenitic state is definitively cancelled out during the passage to the austenitic state.
2. Reversible memory alloys where a deformation undergone in the martensitic state is cancelled out during the passage into the austenitic state, but is reassumed during a subsequent passage to the martensitic state. However, the transformation takes place with a certain hysteresis.

There are numerous alloys having shape memory characteristics such as Ti—Ni, Au—Cd, In—Zn, Ti—Ni—Cu, Cu—Zn—Al and Cu—Al—Ni and many are commercially available. The theory of shape memory alloys is well established and, therefore, need not be discussed in further detail.

There are many examples of fasteners making use of a shape memory alloy (SMA). For example, U.S. Pat. No 5,312,152 "Shape Memory Metal Actuated Separation Device" by W. H. Woebkenberg, Jr., et al. uses a segmented nut that is kept in engagement with a threaded bolt by a retainer.

The retainer is held in place by a SMA element. Upon heating of the SMA element, it returns to its un-deformed state and releases the retainer, which in turn releases the nut.

U.S. Pat. No 5,722,709 "Separation Device Using A Shape Memory Alloy Retainer" by B. K. Lortz also uses a segmented nut. However, in this case the nut is retained in contact with the threaded bolt by a SMA collar. Upon heating, it expands to its original shape releasing the segmented nut. Other examples of fasteners using shape memory alloys can be found in U.S. Pat. No. 5,060,888 Temporary Linking Device Especially For An Artificial Satellite Lengthening Piece, And Method To Free Such A Link" by G. Vezain, et al., U.S. Pat. No. 5,129,753 "Shape Memory Wire Latch Mechanism" by K. S. Wesley, et al., U.S. No. 5,150,770 "Recharge Device, Particularly For Drive Mechanisms For Extending And Withdrawing Operative Members Of A Space Vehicle" by G. Secci and U.S. Pat. No. 5,718,531 "Low Shock Release Device" by E. C. Mutschleer, Jr. All use SMA materials as the primary actuating force. However, when using SMA material as the primary actuating device, precise timing of the release can prove difficult to achieve. In addition, shape memory alloys are sensitive to high temperature environments.

Another approach is to use of ball latches. U.S. Pat. 3,887,150 "Internal Ejector Mechanism" by T. Jakubowski, Jr. U.S. Pat. No. 4,132,147 "Store Retention And Release Mechanism" by A. Contaldo, U.S. Pat. No. 4,350,074 "Mechanical And Electrical Coupling Device Fore Charges, Particularly Military Charges" by J. P. Rouget, et al., U.S. Pat. No. 4,520,711 Loop Retention Device For Hook Operated Bomb Arming Solenoids" by P. R. Robinson, U.S. Pat. No. 5,364,046 "Automatic Compliant Capture And Docking Mechanism for Spacecraft" by M. E. Dobbs, et al., U.S. Pat. No. 5,520,476 "Tie-Down And Release Mechanism For Spacecraft" by G. W. Marks, et al. all disclose the use of ball detent mechanisms to secure components of one type or another together. The main problem with such ball latch fasteners is limited trigger force reduction, which is required for activation with SMA systems. In launch vehicle and spacecraft, which are subjected to very large vibration loads, the satellite must be secured using very high pre-loaded joints. Ball latch systems typically don't allow for the application of type of pre-loads that can be obtained with a threaded fastener. However, they are very good locking devices.

In U.S. Pat. No. 5,603,595 "Flywheel Nut Separable Connector And Method" by W. D. Nygren an attempt was made to take advantage of SMA technology to provide actuation initiation for a conventional nut and bolt and to use the high pre-load forces therebetween to provide the primary separation forces, i.e. to rotate the nut to the point of separation. The nut having a high helix angle or lead is essentially a flywheel. It is torqued until the desired pre-load is achieved. Thereafter, the flywheel is latched. The latch is secured by a SMA spring. Upon heating the spring, the latch releases the flywheel and the stored energy in will cause the flywheel to initially rotate at high speed. The strain energy due to the pre-load is dissipated as the nut unwinds, the stored energy in the flywheel continues to cause the nut to rotate until separation occurs. The advantages are numerous; high pre-loaded joints are possible and the need to only heat a small wire spring greatly reduces actuation time. However, this design had problems in that it had a greater parts count than equivalent explosive actuated separation nuts and was somewhat more massive and occupied more volume.

U.S. patent application Ser. No. 09/610,594 "Connector Assembly" by W. Nygren discloses an improved fastener using a wrap spring. In detail, this invention includes a connecting member including a threaded end with a specific pitch diameter, thread lead angle, and helix angle. A hollow housing having a cylindrical wall with a specific thickness contains a body rotatably mounted therewithin. The body is threadably engagable with the threaded end of the connecting member. A first mechanism releasably restrains the rotatably supported body from rotating until released. The first mechanism includes the cylindrical wall having a plurality of rectangular slots. A plurality of cylindrical rollers are movably mounted in the slots. The body includes a plurality of cylindrical grooves alignable with the slots in the body. A wrap spring is wound about the cylindrical wall of the housing movable from a first position such that the it engages the rollers forcing the rollers into the grooves locking the body to the cylindrical wall of the housing, when the grooves are aligned with the slots to the a second position allowing the rollers to move out of the slots in the body. A second mechanism is included for winding the spring about the cylindrical wall of the housing such that spring is moved from the second relaxed position to the first position. This second mechanism comprises a circular shaped ratchet assembly mounted about the housing. The ratchet assembly includes a first member having flexible pawl springs rigidly attached to the housing and a second member in the form of a ratchet rotatably mounted to the housing and attached to the first end of said spring. A third mechanism is included for releasing the spring when in the first position such that when the third mechanism releases the spring the spring can move to the second position. A fourth mechanism is includes for restraining the threaded end from rotating. A fifth mechanism is included for applying a selected tensile load to the member.

Thus when the connecting member and the body are engaged to form a connection, and with a tensile load applied to the member causing the connection to be strained, the selected thread geometry causes the tensile load to be resolved as a torque applied to the body sufficient to cause the body to rotate when released allowing the threaded end to translate out of engagement with the rotatably supported body allowing the connection to separate. While providing almost shockless separation, it is somewhat difficult to set, because the ratchet assembly of the second mechanism requires the use of a spanner wrench to wind the spring.

Thus it is a primary object of the invention to provide a fastener assembly that automatically separates upon actuation.

It is another primary object of the invention to provide a non-pyrotechnically actuated fastener assembly.

It is a further object of the invention to provide a fastener assembly that automatically separates upon actuation and absorbs the stored energy produced by the pre-loading of the fastener to reduce shock loads.

It is a still further object of the invention to provide a fastener assembly that automatically separates upon actuation and is easily re-settable.

It is a still further object of the invention to provide a fastener assembly that has low-mass, volume and parts count.

It is another object of the invention to provide an improvement to the prior connector assembly using a wrap spring by simplifying the wrap spring setting mechanism.

SUMMARY OF THE INVENTION

The invention is separable connector assembly for joining two surfaces together. In detail, the invention includes a first fastener half, typically a nut, translationaly mounted to the first surface. The first fastener half includes a threaded end with a selected thread geometry including a selected thread pitch diameter, thread lead angle, and helix angle. Preferably the selected helix angle is between 18 degrees and 45 degrees, the selected thread angle is between 0 degrees and 30 degrees (7 degrees is preferred), and the selected thread lead is between 0.5 thread pitch diameters and 1.5 thread pitch diameters.

A hollow housing having a cylindrical wall with a specific thickness is mounted to the second surface. A second fastener half, typically a bolt is rotatably mounted within the hollow housing, the second fastener half threadably engagable with the threaded end of the first fastener half. A first mechanism is included for releasably restraining the rotatably supported second fastener half from rotating. It includes a the cylindrical wall having a plurality of rectangular slots. A plurality of cylindrical rollers are movably mounted in the slots, the rollers having a diameter greater than the thickness of the cylindrical wall of the housing. The second fastener half includes a plurality of cylindrical grooves having a depth less than the diameter of the cylindrical rollers, the grooves alignable with the slots in the second fastener half. A coil spring (wrap spring) is wound about the cylindrical wall of the housing movable from a first position such that it engages the rollers forcing the rollers into the grooves locking the body to the cylindrical wall of the housing, when the grooves are aligned with the slots, to a second position allowing the rollers to move out of the slots in the second fastener half.

A second mechanism is mounted on the housing to wind the spring about the cylindrical wall of the housing such that the spring is moved from the second position to the first position. Preferably, the second mechanism includes a first ring mounted to the housing and a second ring rotatably mounted to the housing coupled to the second end of the wrap spring for moving the wrap spring from the second position to the first position. A locking mechanism is includes for locking the first and second rings together after the second ring has been rotated such that the wrap spring is in the first position. A third mechanism releasably restrains the second end of the wrap spring from moving. Thus when the third mechanism restrains the second end of said spring and the first second ring is rotated, the wrap spring is wound about the housing from the second position to the first position thereof. When the spring reaches the first position, the locking mechanism can inserted locking the two rings together.

The third mechanism is mounted on the housing and coupled to the second end of the spring, when the spring is in the first position such that when the third mechanism releases the spring the spring can move to the second position. Preferably, the third mechanism includes a latch shaft assembly rotatably mounted within the housing movable from a first position to a second position, the shaft assembly having a latch surface that restrains the second end of the spring when the shaft assembly is in the first position and releases the second end of the spring when the shaft is in the second position. A lever is attached to the shaft for moving the shaft from the first position to the second position. When in the first position, the wrap spring biases the shaft lever to rotate the shaft lever to the second position. A balanced latch lever and spring assembly secures the lever such that the shaft is in the first position. The balanced latch lever is acted upon by a SMA wires. Upon heating by the application of electrical current, the SMA wires returns to its original shortened length rotating the balanced latch lever and so releases the shaft lever releasing the shaft and, of course, the wrap spring.

A fourth mechanism is mounted in the housing for restraining the threaded end of the first fastener half from rotating. Finally, a fifth mechanism is mounted on the first surface for applying a selected tensile load to the first fastener half.

Thus when the first fastener half and the second fastener half are engaged to form a connection, and with a tensile load applied to the joined first fastener half causing the connection to be strained, the selected thread geometry causes the tensile load to be resolved as a torque applied to the second fastener half sufficient to cause the second fastener half to rotate when released allowing the threaded end to translate out of engagement with the rotatably supported second fastener half when the mechanism releases the second fastener half allowing the connection to separate.

Preferably, the rotatably supported second fastener half has a selected mass moment of inertia and the selected thread geometry is such that less than 10 percent of the strain energy stored in the connection between the first fastener half and the rotatably supported second fastener half, not dissipated as heat due to friction, is converted into translational kinetic energy of the first fastener half during separation.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3A is a is a cross-sectional view of FIG. 2 taken along the line 3—3 in FIG. 2 illustrating the second half of the connector assembly, in the first (latched) position.

FIG. 3B is a cross-sectional view similar to FIG. 3A illustrating the connector assembly in the actuated (unlatched) condition.

FIG. 5 is a partial perspective view of the latch mechanism illustrated in FIG. 4A.

DESCRIPTION OF THE PREFERRED EMBODIMENT

Figure 1:
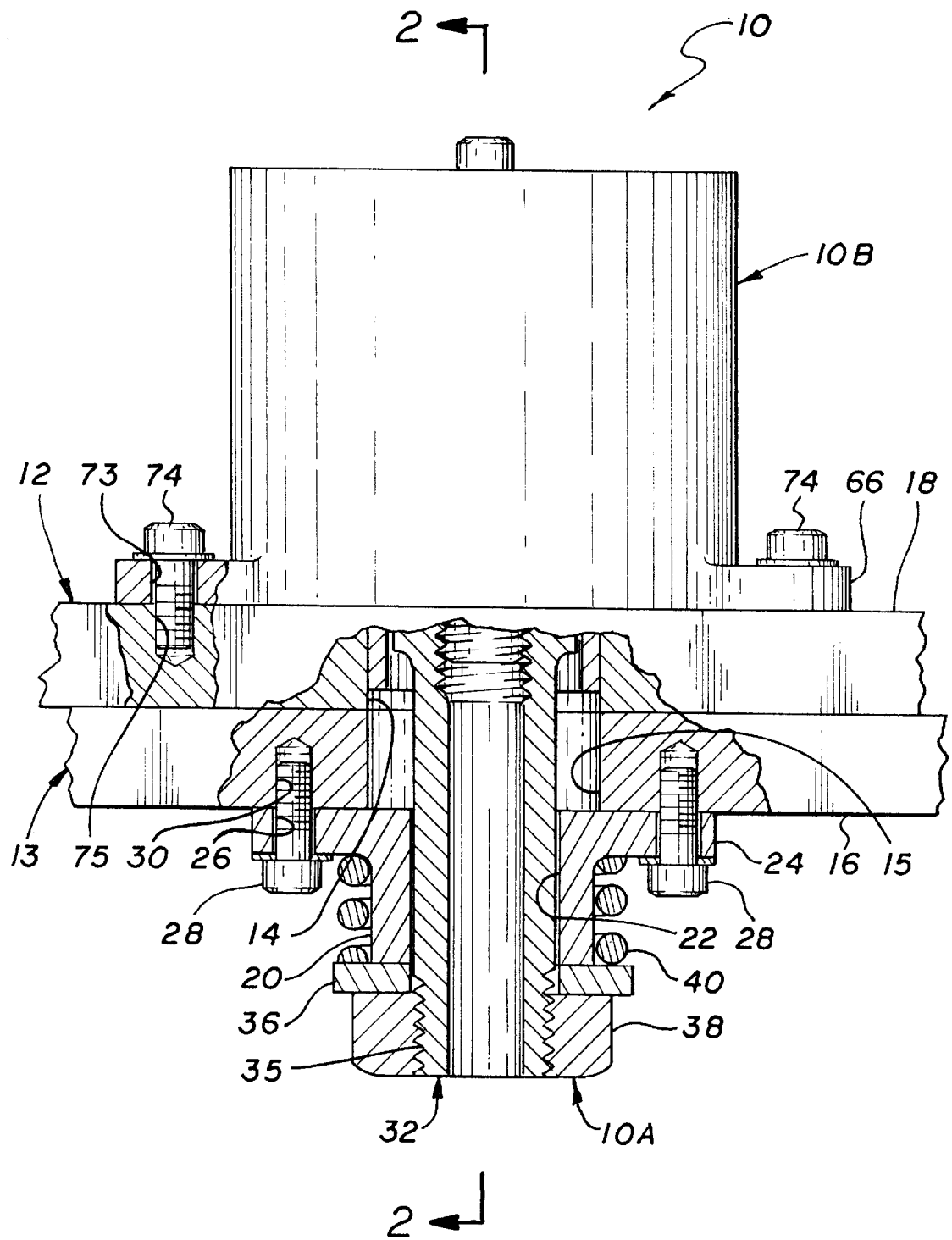
FIG. 1 is a partial cross-sectional of the connector assembly shown connecting two structural elements together with the first connector half of the connector assembly in cross-section.
Figure 2:
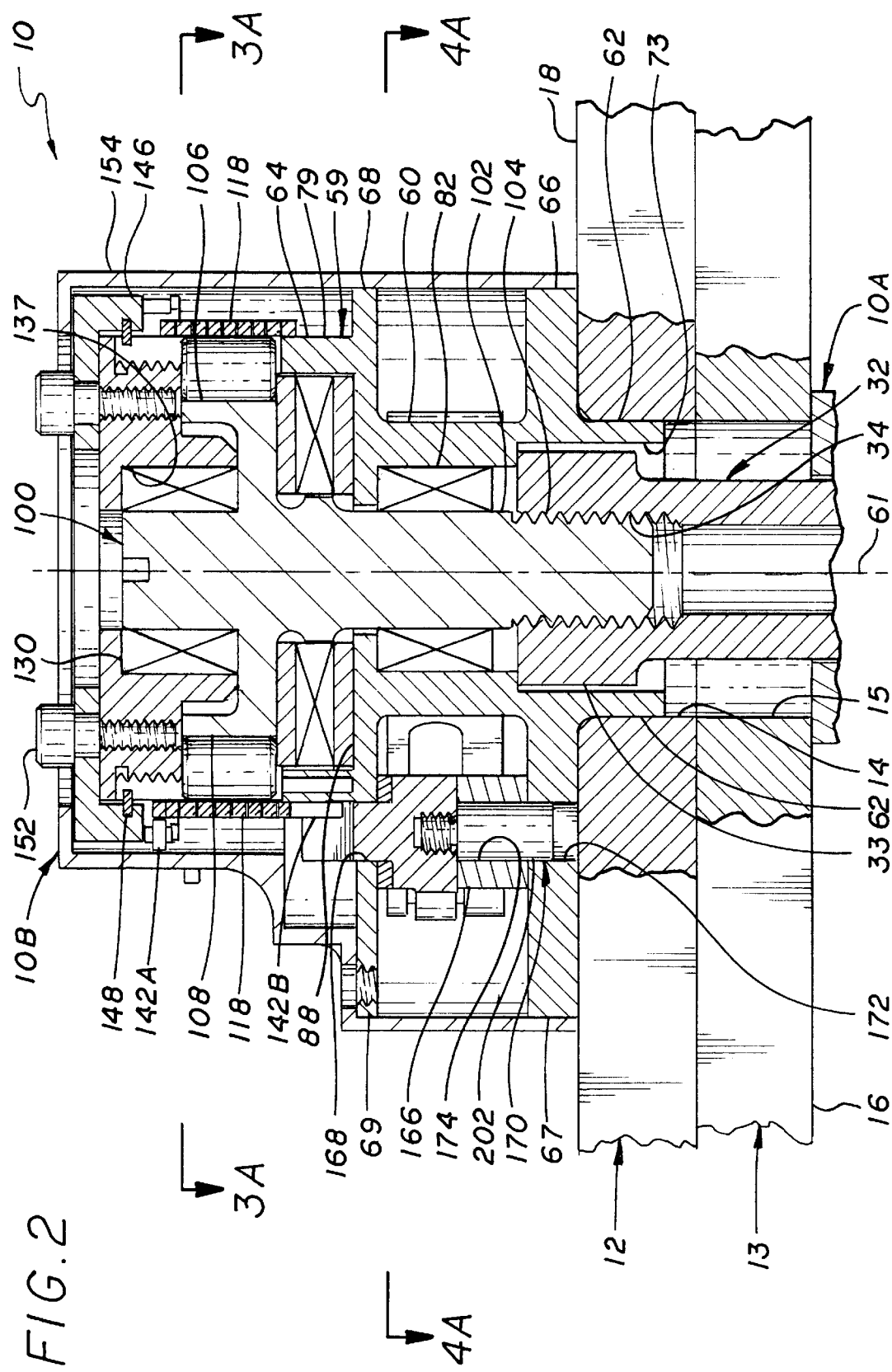
FIG. 2 is an enlarged cross-sectional view of FIG. 1 taken along the line 2—2 illustrating the second part of the connector assembly in the first position (latched).
Figure 2A:
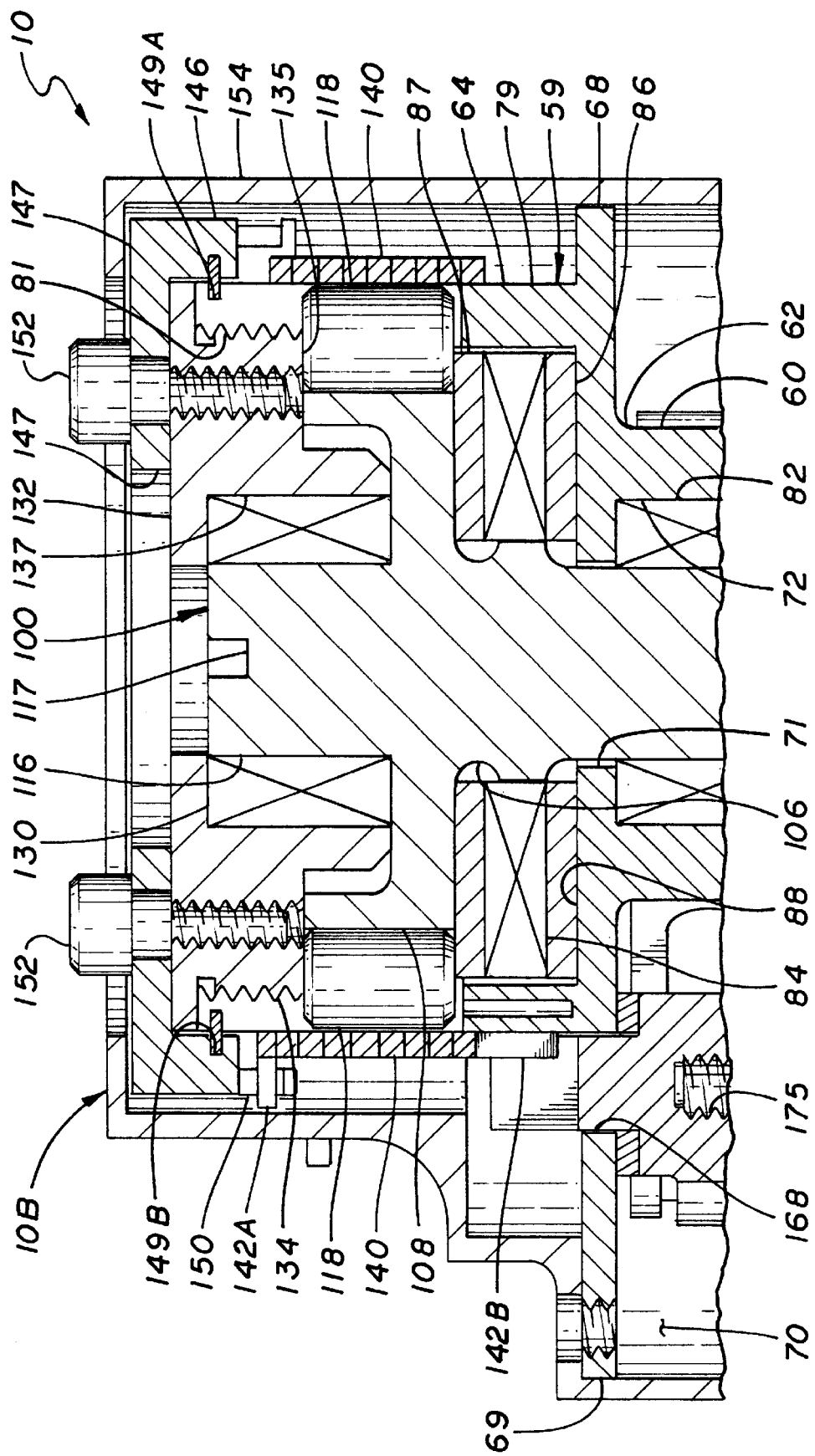
FIG. 2A is an enlarged portion of FIG. 2.
Figure 4A:
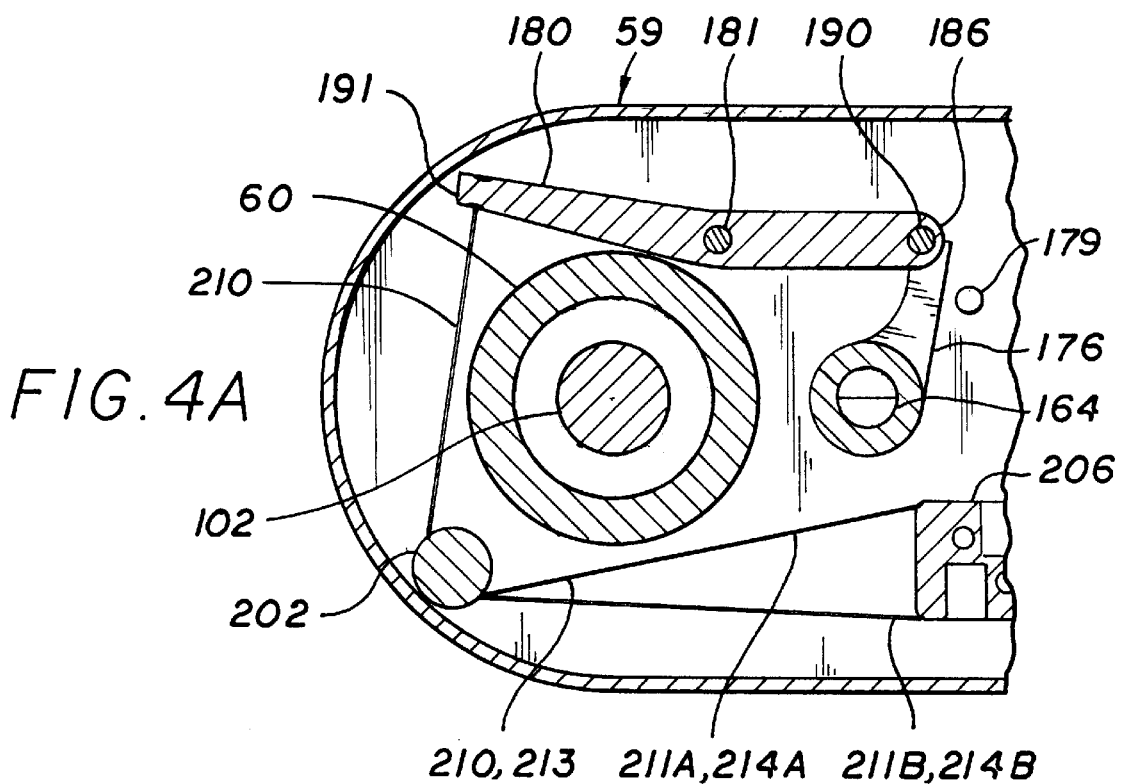
FIG. 4A is a is a cross-sectional view of FIG. 2 taken along the line 4—4 in FIG. 2 illustrating the release mechanism the latched position.
Figure 4B:
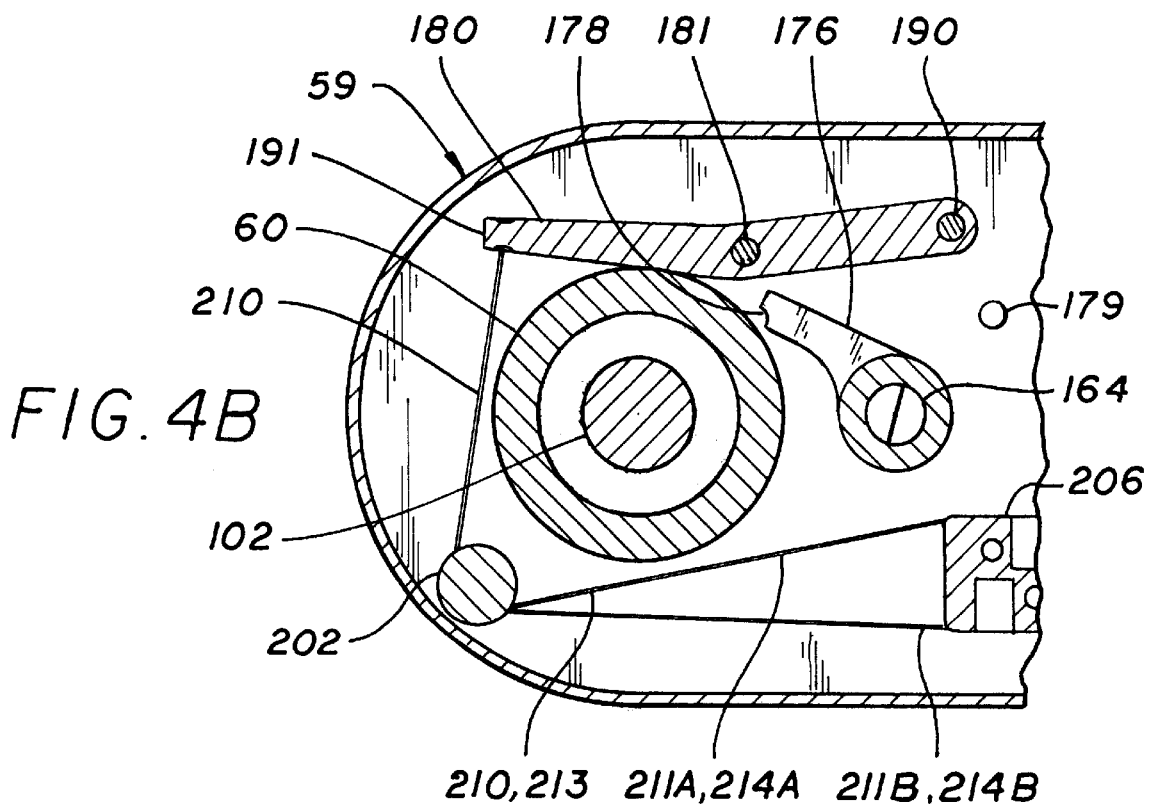
FIG. 4B is a is a cross-sectional view similar to FIG. 4A illustrating the release mechanism in the unlatched position.
Figure 6A:
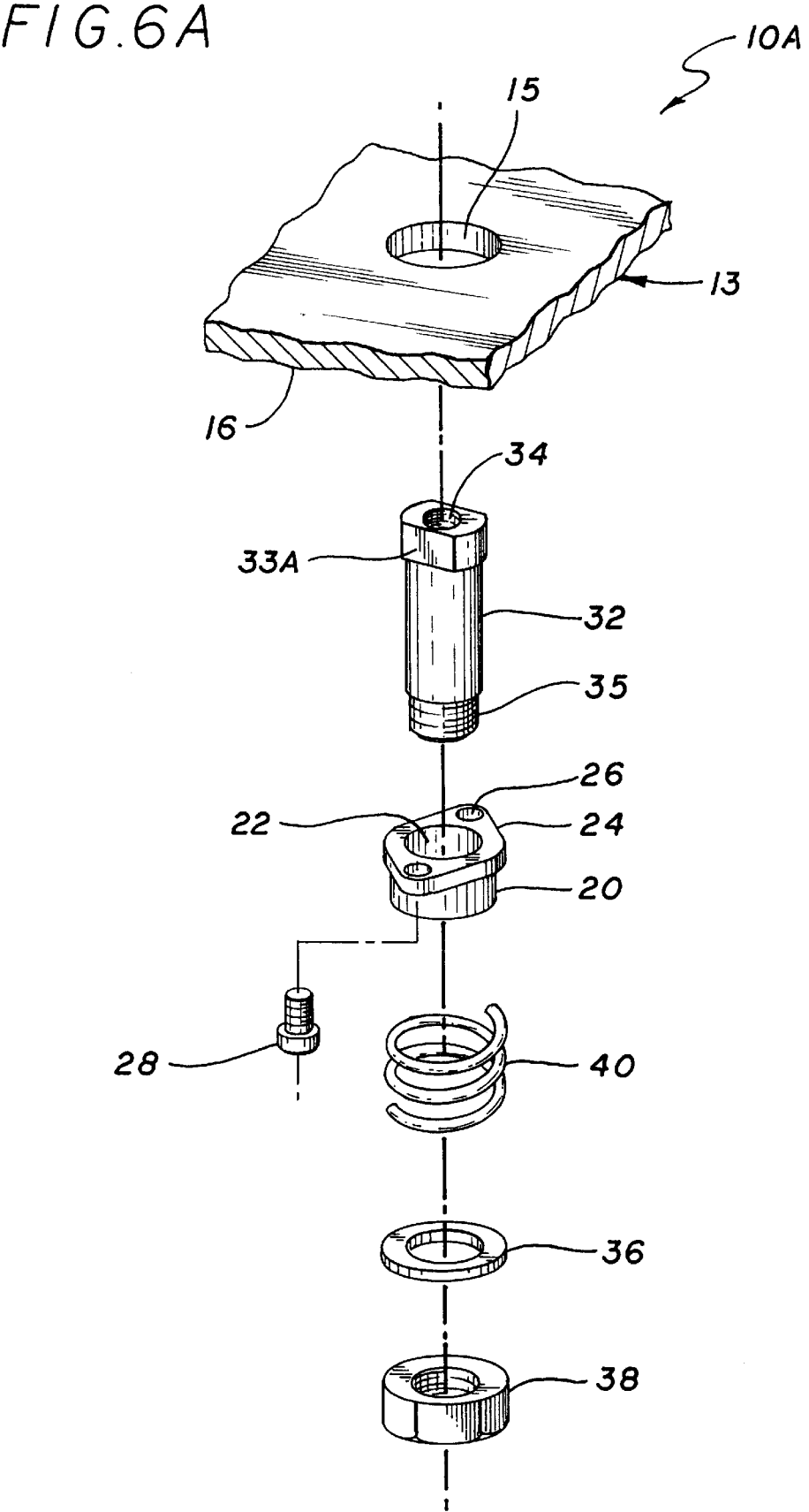
FIG. 6A is an exploded cross-sectional view of a first portion of the connector assembly shown in FIG. 1.
Figure 6B:
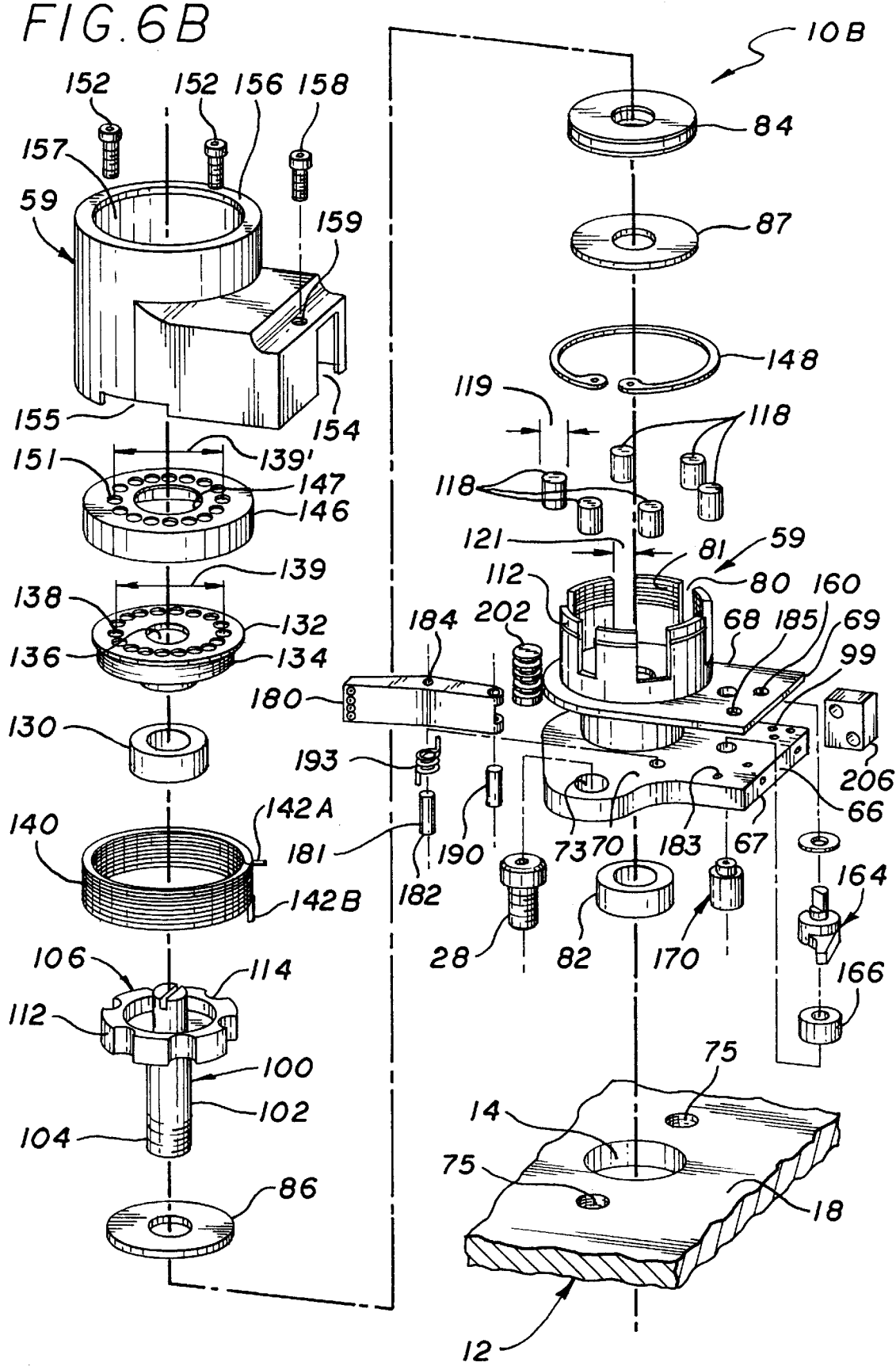
FIG. 6B is an exploded cross-sectional view of a second portion of the connector assembly shown in FIG. 1.
Figure 7:
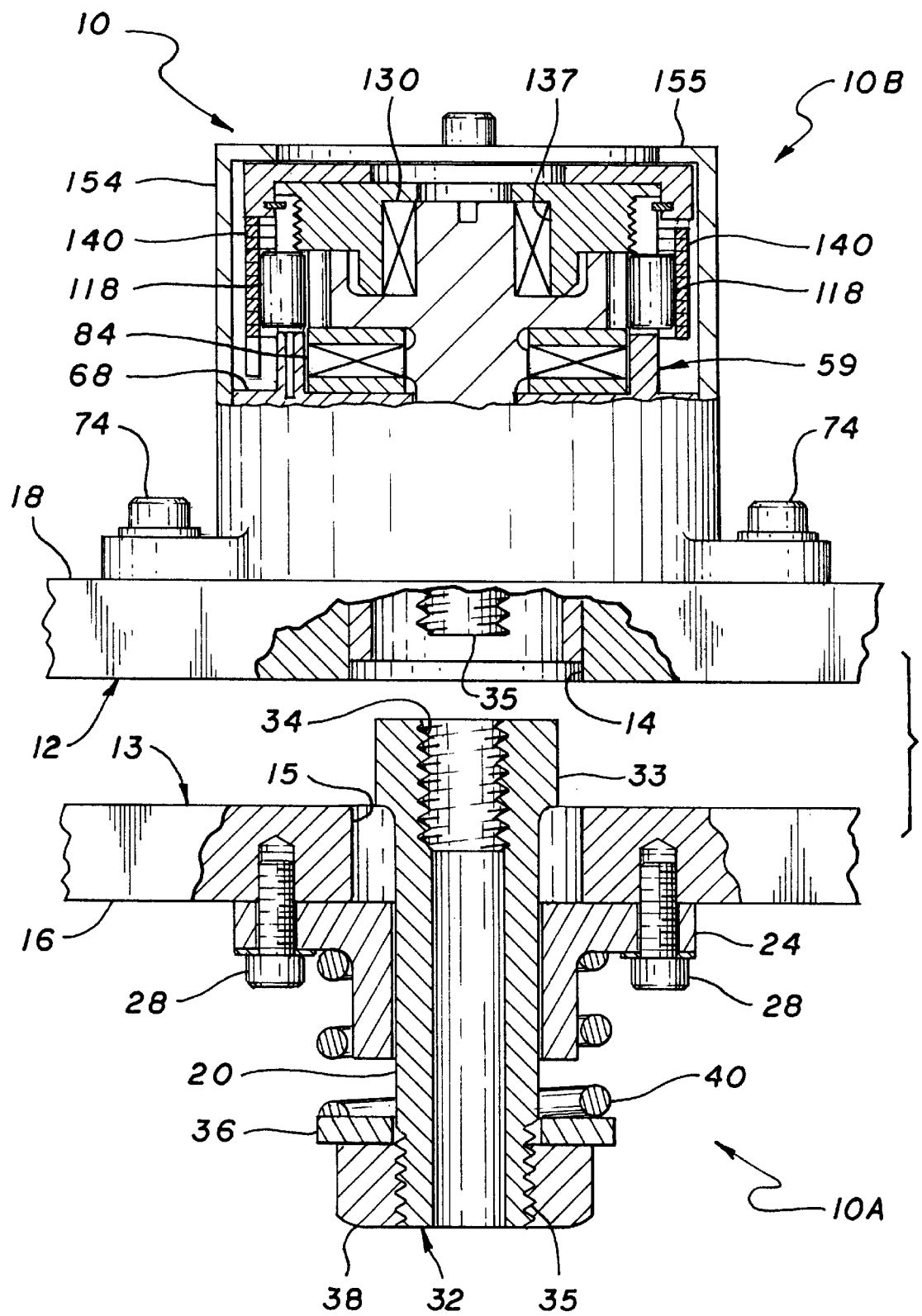
FIG. 7 is a cross-sectional view similar to FIG. 1 illustrating the connector assembly in the unlatched or actuated condition.
Figure 7A:
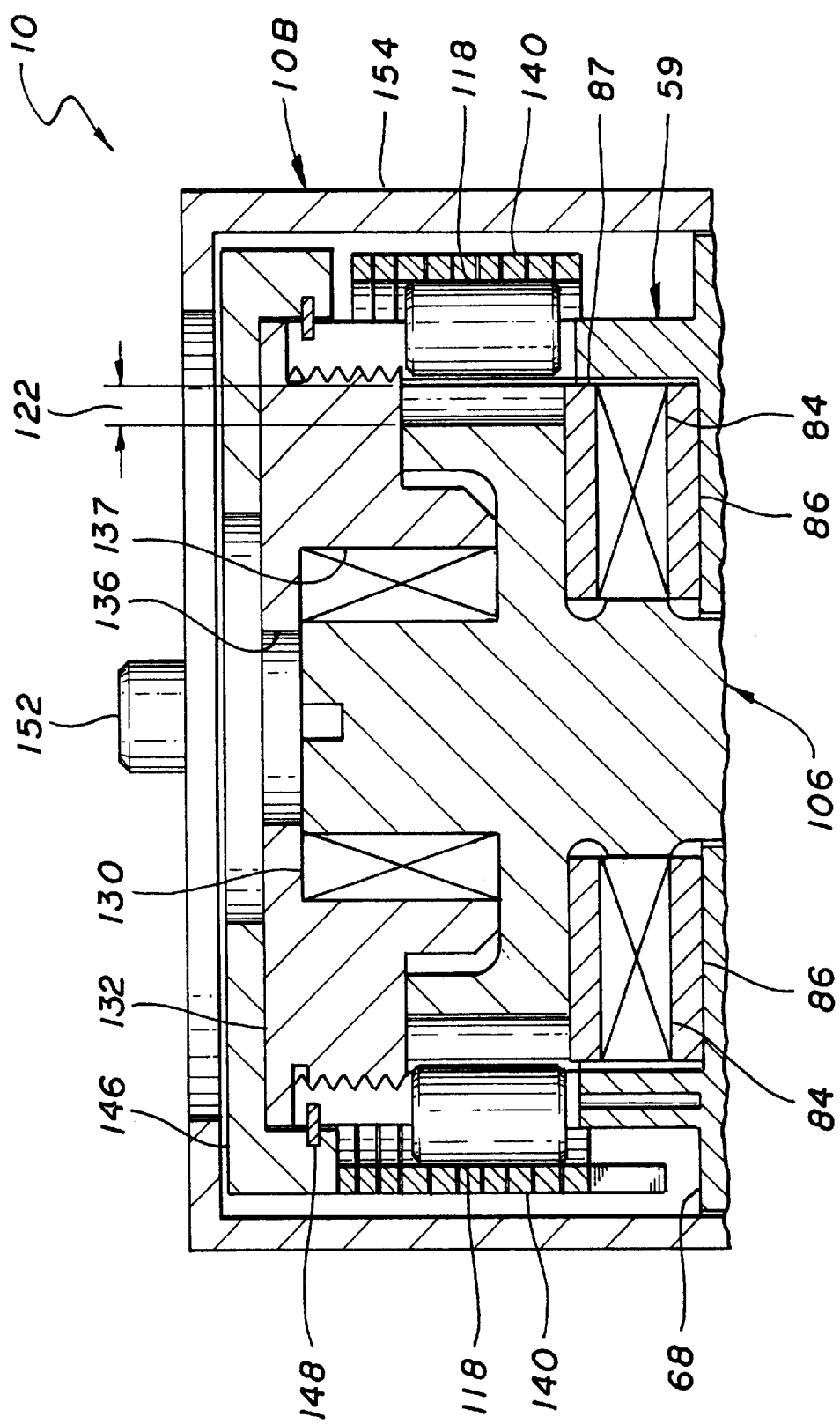
FIG. 7A is an enlarged portion of FIG. 7.

Referring to FIGS. 1 through 7A, the connector assembly, generally designated by numeral 10, is used to join two structural elements 12 and 13, respectively. Structural element 12 includes a hole 14 therethrough, while structure 13 includes a hole 15 therethrough. The connector assembly 10 includes first connector half 10A mounted on surface 16 of structural element 13 and second connector half 10B mounted on surface 18 of structural element 12. Connector half 10A includes a hollow cylindrical member 20, having an internal bore 22 and an external flange 24. The flange 24 includes fastener holes 26 having fasteners 28 engaging threaded holes 30 in the surface 16 of structural element 13. A first hollow fastener half 32 is slidably mounted in the bore 22. It includes a circular shaped end 33 with flats 33A and with internal threads 34 extending through the hole 15 and into 14 (see FIG. 6A). The purpose of the flats 33A will be subsequently discussed. The fastener half 32 also includes a externally threaded end portion 35,. A washer 36 is mounted about the threaded end 35 of the first fastener half 32 secured thereto by a threaded nut 38. A coil spring 40 is mounted about the housing 20 and extends between the flange 24 and washer 36 biasing the first fastener half 32 away from the structure element 13.

The second connector half 10B of the connector assembly 10 includes a housing 59 having circular portion 60 with a longitudinal axis 61 with first and second ends 62 and 64, respectively. The first end 62 of the housing 59 is adapted to extend into the hole 14 in structural element 12. A flange 66 is mounted to the circular portion 60 in proximity to the end 62 and which includes and extend portion 67. A flange 68, also having an extend portion 69 is mounted to the circular portion 60 in a spaced relationship to the flange 66 forming a space 70. The housing 60 further includes a central bore 71 having a counter bore 72 and a slot 73 all aligned with the longitudinal axis 61. The flange 66 includes fastener holes 73 having fasteners 74 engaging threaded holes 75 in the surface 18 of structural element 12 (best seen in FIG. 1). The second end 64 is in the form of a hollow cup shaped member 79 that extends from the flange 68 and includes a plurality of equally spaced slots 80. As illustrated, there are 6 slots 80, but depending upon the particular application there could be more or less. The cup shaped member 79 also includes internal threads 81 at its open end. A shaft bearing 82 is mounted within the counter bore 72 by means of a press-fit. A thrust bearing 84 sandwiched between washers 86 and 87 are all mounted on the top surface 88 of the flange 68 within the cup shaped member 79.

A second fastener half 100 is rotatably mounted within bore 71 of the housing 59. The second fastener half 100 includes a bolt portion 102 that is supported in part by bearings 82 and 84 and extends through bore 71 in the housing 59 and having a threaded first end 104 releasably engaged with the threaded end 34 of the first fastener half 32. The second end 106 includes a cup shaped member 108 with an external surface 112 and a having plurality of equally spaced vertical grooves 114 alignable with the slots 80 in the cup shaped member 79 of the housing 59. The second fastener half 100 further includes a central post 116 having a screwdriver slot 117.

Cylindrical roller pins 118, having a diameter 119, are mounted in the slots 80 and are extendable into the grooves 114. The width 121 of the slots 80 and the maximum depth 122 of the grooves 114 have a geometric relationship with a radius equal to half the diameter 119 of the pins 118. Thus with the roller pins 118 at the maximum depth within the grooves 114, the pins are approximately flush with the external surface 112 of the cup shaped member 108.

A second shaft bearing 130 is mounted about the post 116. A cap 132 having threaded end 134 is engaged with the internal threads 81 on the member 79 such that end flange 135 contacts the end of the cup shaped member 79 when the threads are fully engaged. The cap 132 further includes bore 136 with a counter bore 137 in engagement with the bearing 130 and providing support therefore. It also includes a plurality of equally spaced threaded holes 138 in circle having a diameter 139. Mounted about the member 79 is a wrap spring 140 having first and second ends 142A and 142B. A cup shaped member 146, having a hole 147 therethrough, is movably mounted over the cap 132 and secured to the member 79 of the housing 59 by means of snap ring 148 mounted in mating grooves 149A and 149B in the members housing 59 and member 146, respectively. The first end 142A of the wrap spring 140 engages a hole 150 in the member 146. The member 146 further includes a plurality of equally spaced holes 151 in circle having a diameter 139', but with two less holes than the cap 132. For example 18 treaded holes 138 in member 132 and 16 holes 151 in member 146. Fasteners 152 join the member 146 to the cap 132. A hollow cover 154 having an open first end 155 and an end 156, having a hole 157, therein covers the housing 59. It is attached by screw 158 extending through hole 159 the cover 154 and engages threaded hole 160 in the flange 68 thereof.

A latch shaft assembly 164 is rotatabley mounted in space 70 between the flanges 66 and 68 of the housing 59 on top of a spacer 166. The latch shaft assembly 164 includes a latching surface 165 that extends through a hole 168 in the flange 68. It is positioned by means of a shaft assembly 170 that extends through a hole 172 in the flange 66 and a hole 174 in a spacer 166 and threadably engages a threaded hole 175 in the cam shaft assembly 164. The latching surface 165 is in releasable engagement with the second end 142B of the wrap spring 140. The latch shaft assembly 164 also includes an arm 176 having a notch 178 at its free end. A pin 179 mounted in flange 66 acts as a stop preventing clockwise rotation of the cam shaft 164. A lever arm 180, made of a non-conductive material, is pivotally mounted at its center to a pin 181. The pin 181 includes an end 182 that extends through a hole 183 in the flange 66, a hole 184 in the lever arm 180 and engages a hole 185 in the flange 68. The first end 186 of the lever arm 180 includes notch 188 having a pin 190 therein that is in releasable engagement with the notch 178 of the cam shaft assembly 164. The second end 191 includes two sets of holes with each set having two holes 192A and 192B and 193A and 193B. A spring 194 includes a first end 195 that extends into a hole 195 in the flange 66 a middle portion wound about pin 181 and a second end 197 in engagement with the lever arm 180. Thus the spring biases the lever arm 180 in a clockwise direction into engagement with the cam shaft assembly 164. A pin 202 is mounted to the flange 66 having four circular grooves 204A, B, C, D. A terminal block 206 is also mounted to the flange 66 by means of screws 208.

A first SMA wire 210 is connected by its ends 211A and 211B to the terminal block 206 and extend about the pin 202 via the notches 204A and 204B through hole 192A and back through hole 192B around notch 204B and back to the terminal block 206. A second SMA wire 213 is connected by its ends 214A and 214B to the terminal block 206 and extend about the pin 202 via notches 204C and 204D through hole 193A and back through hole 193B around notch 204D and back to the terminal block 206. The terminal block is connected to an electrical power supply (not shown).

Thus with the latch shaft assembly 164 is prevented from rotating by the lever arm 180, which is biased to prevent rotation away from the latch shaft assembly, the latch surface 165 prevents the second end 142B of the wrap spring 140 from moving. In this position, the first and second connector assembly halves 10A and 10B are mounted on the structural elements 12 and 13. The first fastener half 32 can then be threadably engaged with the second fastener half 100. To accomplish this the cover 154 is removed. The latch shaft assembly 164 is rotated to the position shown in FIG. 4A such that the lever arm 180 is in engagement therewith. A screw driver (not shown) is inserted through the hole 147 in member 146 and hole 136 in the cap 132 and engaged with the slot 117 in the post 116 of the second fastener half 100. The screwdriver is used to both connect the second fastener half 100 with the first fastener half 32 and to align the grooves 114 in cup shaped member 108 with the slots 80 in the cup shaped member 79 of the housing 59. This requires that the first fastener half 32 to be pushed into contact with the second fastener half 100. A this point, the cap 146 is rotated causing the wrap spring 140 to wind about the cup shaped member 79 forcing the rollers 118 into the grooves 114, locking the second fastener half place. Thereafter, the tension load on the first and second fastener halves 32 and 100 is applied by torquing the nut 38. The amount of torque applied can be correlated with the amount of tension load applied to the first and second fastener halves 32 and 100.

When an electrical current is applied to the SMA wire 210 and/or SMA wire 213, they will heat up and return to their high temperature state and shorten. This causes the lever arm 180 to rotate causing it to release the latch shaft assembly 164 to rotate to a position allowing it to disengage from the end 142B of the wrap spring 140 allowing it to unwind freeing the rollers 118 and allowing them to move out of contact with the grooves 114 in the second fastener half 100. At this point in time the second fastener half 100 is free to rotate.

In U.S. Pat. No. 5,603,595 "Flywheel Nut Separable Connector" by W. D. Nygren, Jr., incorporated by reference herein, it is disclosed that by proper selection of the internal threads 34 on the first fastener half 32 and external threads on the threaded first end 104 of the second fastener half 100 and proper tensioning of the connection between the first and second fastener halves, upon release of the second fastener half, it automatically and rapidly unthreads from the first fastener half. This is particularly true if the treads have a thread angle between zero and 30 degrees (preferably 7 degrees), helix angles of between 18 and 45 degrees and second (both half) fastener leads of between 0.5 and 1.5 pitch diameters. The important criteria is that the selected thread geometry generates, under the load, a sufficiently high torque to overcome the rotationally resistive load bearing friction torque of the thrust bearing acting on the second fastener half 10, and the resistive torque due to thread friction form the thread end engagement of the first and second fastener halves. The theoretical calculations in support of this design are found in the above referenced patent. Once released, the first fastener half 32 being biased away from the first fastener half 100 by spring 40, it retracts, but is prevented from leaving the member 20 because the end 33 is larger than the bore 22.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to fastener manufacturing industry.

What is claimed is:

1. A separable connector assembly comprising:
    a first fastener half having a threaded end having a selected thread geometry including a selected thread pitch diameter, thread lead angle, and helix angle;
    a hollow housing having a cylindrical wall with a specific thickness;
    a second fastener half rotatably mounted within said hollow housing, said second fastener half threadably engagable with said threaded end of said first fastener half;
    first means for releasably restraining said rotatably supported second fastener half from rotating, said first means comprising:
        said cylindrical wall having a plurality of rectangular slots;
        a plurality of cylindrical rollers movably mounted in said slots, said rollers having a diameter greater than said thickness of said cylindrical wall of said housing;
        said second fastener half having a plurality of cylindrical grooves having a depth less than the diameter of said cylindrical rollers, said grooves alignable with said slots in said second fastener half;
        a wrap spring having first and second ends wound about said cylindrical wall of said housing movable from a first position such that it engages said rollers forcing said rollers into said grooves locking said body to said cylindrical wall of said housing, when said grooves are aligned with said slots to said a second position allowing said rollers to move out of said slots in said body;
    second means to wind said spring about said cylindrical wall of said housing such that spring is moved from said second position to said first position, said second means comprising
        a first ring mounted to said housing;
        a second ring rotatably mounted to said housing coupled to said second end of said wrap spring for moving said wrap spring from said second position to said first position;
        locking means for locking said first and second rings together after said second ring has been rotated such that said wrap spring is in said first position; and
    third means coupled to said second end of said wrap spring to release said spring when in said first position such that when said third means releases said spring, said spring can move to said second position; and
    fourth means for restraining said threaded end of said first fastener half from rotating; and
    fifth means for applying a selected tensile load to said first fastener half;
    wherein with said first fastener half and said second fastener half are engaged to form a connection, and with a tensile load applied to said first fastener half causing the connection to be strained, the selected thread geometry causes the tensile load to be resolved as a torque applied to said second fastener half sufficient to cause said second fastener half to rotate when released, allowing said threaded end to translate out of engagement with said rotatably supported second fastener half when said first and third means releases said second fastener half allowing said connection to separate.

2. The assembly as set forth in claim 1 wherein said selected helix angle is between 18 degrees and 45 degrees.

3. The assembly as set forth in claim 1 wherein said selected thread angle is between zero degrees and 30 degrees.

4. The assembly as set forth in claim 1 wherein said selected thread lead is between 0.5 thread pitch diameters and 1.5 thread pitch diameters.

5. The assembly as set forth in claim 1 wherein said rotatably supported second fastener half has a selected mass moment of inertia and said selected thread geometry is such that less than 10 percent of the strain energy stored in the connection between said first fastener half and said rotatably supported second fastener half not dissipated as heat due to friction is converted into translational kinetic energy of said first fastener half during separation.

6. The assembly as set forth in claim 5 third means comprises:
    a latch shaft assembly mounted within said housing movable from a first position to a second position, said latch shaft assembly having a latch surface releasably restraining said second end of said spring when said latch shaft assembly is in said first position and releases said first end of said spring said latch shaft assembly is in said second position; and
    sixth means to releasable secure said latch shaft assembly in said first position.

7. The assembly as set forth in claim 6 third means comprises:
    a latch shaft assembly rotatably mounted within said housing movable from a first position to a second position, said latch shaft assembly having a latch surface releasably restraining said second end of said spring when said latch assembly is in said first position and releases said first end of said spring said latch shaft assembly is in said second position;
    a lever attached to said latch shaft assembly for moving said latch shaft assembly from said first position to said second position;
    a second spring biasing said lever to rotate said shaft to said second position;
    sixth means to releasable secure said lever such that said shaft is in said first position.

8. A connector assembly for releasably connecting a first structural element to a second structural element, said connector assembly comprising:
    a first fastener half having a first threaded end, said first fastener half translatably mountable to said first structural element;
    a hollow housing mountable to said second structural element, said housing having a cylindrical wall;
    a rotatable second half of a fastener mounted within said housing threadably engagable with said first threaded end and rotatably supported against said first surface for rotation about said threaded end;
    a second fastener half rotatably mounted within said hollow housing, said body threadably engagable with said threaded end of said first fastener half;
    first means for releasably restraining said rotatably supported second fastener half from rotating, said first: means comprising:
        said cylindrical wall having a plurality of rectangular slots;
        a plurality of cylindrical rollers movably mounted in said slots, said rollers having a diameter greater than said thickness of said cylindrical wall of said housing;

said second fastener half having a plurality of cylindrical grooves having a depth less than the diameter of said cylindrical rollers, said grooves alignable with said slots in said second fastener half;

a wrap spring wound about said cylindrical wall of said housing movable from a first position such that it engages said rollers forcing said rollers into said grooves locking said body to said cylindrical wall of said housing, when said grooves are aligned with said slots to said a second position allowing said rollers to move out of said slots in said body;

second means to wind said spring about said cylindrical wall of said housing such that spring is moved from said second position to said first position, said second means comprising
  a first ring mounted to said housing;
  a second ring rotatably mounted to said housing coupled to said second end of said wrap spring for moving said wrap spring from said second position to said first position;
  locking means for locking said first and second rings together after said second ring has been rotated such that said wrap spring is in said first position; and third means to release said spring when in said first position such that when said third means releases said spring, said spring can move to said second position; and fourth means for restraining said threaded end of said first fastener half from rotating; and fifth means for applying a selected tensile load to said first fastener half;
  second means to wind said spring about said cylindrical wall of said housing such that spring is moved from said second position to said first position, said second means comprises:
    a first hollow ring mounted to said housing having a plurality of first holes in a circular pattern;
    a second hollow ring rotatably mounted to said housing having a plurality of second holes in said circular pattern, said second hollowing coupled to said second end of said wrap spring; and
    fastener means for mounting in said first and second holes locking said first and second rings into contact with each other after said second ring has bee rotated to move said wrap spring from said first position to said second position;
  third means coupled to said second end of said wrap spring to release said spring when in said first position such that when said third means releases said spring said spring can move to said second position; and
  fourth means mountable to said first surface for restraining said first threaded end from rotating; and
  fifth means mountable to said first surface for applying a tensile load to said connecting member;
  wherein, with said first fastener half and the rotatably supported second fastener half are engaged to form a connection, and with a tensile load applied to the first fastener half causing strain energy to be stored in the connection, the tensile load is resolved as a torque applied to said rotatably supported second fastener half sufficient to cause said rotatable said second fastener half to rotate when released, said threaded end translating out of engagement with said rotatably supported first fastener half separating the connection.

9. The assembly as set forth in claim 8 comprising:
  said housing having a load bearing surface; and
  said rotatably supported body includes;
    a threaded hub portion; and
    a mass supported about said hub portion on said load bearing surface of said housing.

10. The assembly as set forth in claim 9 wherein said rotatable body is rotatably supported on bearing means disposed between mass and said load bear surface.

11. The assembly as set forth in claim 10 wherein:
  said first fastener half having a portion thereof having a non-circular cross-section;
  said fourth means comprising a second hollow housing mounted to the first surface; said second housing having an opening with a cross-section for receiving said portion of said first fastener half having said non-circular cross-section.

12. The assembly as set forth in claim 11 wherein said fifth means comprises:
  said first fastener half having a threaded end; and
  a nut threadably engaged with said threaded of said first fastener half and also engagable with said second housing;
  such that when said first fastener half is threadably engaged with said second fastener half, said nut can be adjusted to engage said second housing causing said first and second fastener halves to be strained.

13. The assembly as set forth in claim 12 third means comprises:
  a latch shaft assembly mounted within said housing movable from a first position to a second position, said latch shaft assembly having a latch surface releasably restraining said second end of said spring when said latch shaft assembly is in said first position and releases said first end of said spring said latch shaft assembly is in said second position; and
  sixth means to releasable secure said latch shaft assembly in said first position.

14. The assembly as set forth in claim 13 wherein said sixth means comprises:
  a first lever attached to said latch shaft assembly;
  a balanced second latch lever releasably engaging said first lever;
  biasing means to urge said balanced second latch lever in engagement with said first lever; and
  means to move said balanced second shaft out of engagement with said first lever.

15. The assembly as set forth in claim 14 wherein said means to move said balanced second lever out of engagement with said first lever comprises a shape memory wire attached between said balanced second latch lever and said housing;
  such that when said wire is heated said wire shortens causing said balanced second latch lever to rotate out of contact with said first lever.

* * * * *